United States Patent
Ash et al.

(10) Patent No.: US 7,605,756 B2
(45) Date of Patent: Oct. 20, 2009

(54) SYSTEM A METHOD AND AN APPARATUS FOR PERFORMING WIRELESS MEASUREMENTS, POSITIONING AND SURFACE MAPPING BY MEANS OF A PORTABLE COORDINATE SYSTEM

(75) Inventors: Chaim Ash, Netanya (IL); Yuri G. Volodine, Ramat-Gan (IL); Lenny M. Novikov, Fair Lawn, NJ (US); Michael Kovtun, Netanya (IL)

(73) Assignee: EZ 2 Cad Ltd, Netanya (IL)

( * ) Notice: Subject to any disclaimer, the term of this patent is extended or adjusted under 35 U.S.C. 154(b) by 252 days.

(21) Appl. No.: 10/598,415

(22) PCT Filed: Feb. 23, 2005

(86) PCT No.: PCT/IL2005/000219

§ 371 (c)(1),
(2), (4) Date: Aug. 29, 2006

(87) PCT Pub. No.: WO2005/081630

PCT Pub. Date: Sep. 9, 2005

(65) Prior Publication Data

US 2007/0182632 A1    Aug. 9, 2007

Related U.S. Application Data

(60) Provisional application No. 60/548,278, filed on Mar. 1, 2004.

(51) Int. Cl.
*G01S 1/00* (2006.01)
*G01C 3/08* (2006.01)

(52) U.S. Cl. .......................... 342/385; 342/463; 356/3.1

(58) Field of Classification Search ............ 342/357.09, 342/357.1, 457, 385, 463, 465; 701/207, 701/213; 340/572.1; 356/3.01, 3.1
See application file for complete search history.

(56) References Cited

U.S. PATENT DOCUMENTS 6,204,813 B1    3/2001    Wadell et al.

(Continued)

FOREIGN PATENT DOCUMENTS

DE            3914895        11/1990

(Continued)

*Primary Examiner*—Isam Alsomiri
(74) *Attorney, Agent, or Firm*—Dr. D. Graeser Ltd.; Dvorah Graeser (57) ABSTRACT

The present invention is a new multifunctional low-cost solution for performing measurements and positioning in construction sites and automatically extracting a three-dimensional virtual model, plans, elevations and sections drawings based on these measurements. The preferred embodiment of the present invention consists of a field beacon or a set of field beacons, spread around the measured area, communicating by omnidirectional signals with at least one central signal collector, which communicates with a computer. Dedicated computer software performs the spatial calculations and other applicable functions. The disclosed system is used for laying out axes and columns at the beginning stage of construction while ensuring the exact match of each mark to its planned position, and for quality and exactitude control of constructions or assembling. In addition the system may be used for locating and tracking objects in a predefined area and automatic directing of machinery to target points.

22 Claims, 4 Drawing Sheets

U.S. PATENT DOCUMENTS

| | | |
|---|---|---|
| 6,246,468 B1 | 6/2001 | Dimsdale .................. 356/4.02 |
| 6,512,478 B1 | 1/2003 | Chien |
| 6,640,253 B2 | 10/2003 | Schaefer |
| 6,781,683 B2 | 8/2004 | Kacyra et al. ............ 356/141.1 |
| 2004/0017313 A1 | 1/2004 | Menache |
| 2004/0203846 A1 | 10/2004 | Caronni et al. ........... 455/456.1 |

FOREIGN PATENT DOCUMENTS

| | | |
|---|---|---|
| GB | 2358429 | 7/2001 |

SYSTEM A METHOD AND AN APPARATUS FOR PERFORMING WIRELESS MEASUREMENTS, POSITIONING AND SURFACE MAPPING BY MEANS OF A PORTABLE COORDINATE SYSTEM

CROSS-REFERENCE TO RELATED APPLICATIONS

This application is a US National Stage of PCT/LL2005/00219, filed Feb. 23, 2005, which claims priority to Provisional Application No. 60/548,278, filed Mar. 1, 2004.

BACKGROUND

The present invention relates in general to performing distance measurement to target points, surfaces mapping by a minimum number of points for surface definition and positioning of target points by wireless means using a portable coordinate system and a PC. It is also related to automatic generation of as-built drawings, to marking positions in relation to an existing computer drawing, construction quality control, three dimensional virtual modeling, object location and the like.

Prior art for performing wireless measurements is based on laser-optical or laser scanning devices. The laser scanning devices perform vertical and horizontal scanning on a tight grid in order to determine the three dimensional positions of surfaces in their immediate surroundings. U.S. Pat. No. 6,781,683, for instance, discloses such a device. The patent describes a method for operating a laser scanning system. The laser scanning system can be used in construction projects to generate a field survey which may later be used by an architect or engineer to create construction drawings. In addition, relevant points from the construction drawings can be identified at the construction site with the scanning system. The main drawback of such systems is that they must rely on existing drawings and may not generate computerized three-dimensional drawings of the scanned objects and surroundings.

U.S. Pat. No. 6,246,468 overcomes this shortcoming. It is an integrated system which generates a model of three-dimensional objects. A scanning laser device scans the three-dimensional objects and generates a point cloud whereas each point indicates a location of a corresponding point on a surface of the objects. According to this point cloud a model is generated representing constituent geometric shapes of the objects. A data file is than generated, responsive to that model, which can be inputted to a computerized design system.

Although this system can produce computerized three-dimensional drawings of the scanned objects, it still has several limitations. Since laser based systems may only scan objects in their line of sight any interfering obstacle between the scanning device and the measured surfaces prevent them from achieving correct measurements. In addition, this is a highly complex system, which demands extensive computing resources.

It is therefore the purpose of the present invention to provide efficient and cost effective means for accurately performing wireless measurements in diverse environments, and which may automatically produce as-built three-dimensional computerized models and drawings (plans, sections and elevations).

It is yet another purpose of the present invention to provide wireless positioning means. Known in the art are several means for finding the location of an item or a person relying on radio frequency (RF) communication using RF identification (RFID) tags. Such systems are used in warehouses for keeping track of inventory and in large facilities for locating equipment and staff. Usually these systems determine the approximate position of a tag or may give indication as for the existence of a tag in an enclosed space, such as a room. In addition, most often these systems calculate the position of an object based on information about its previous location.

While these systems may provide a sufficient level of precision for their purposes, there is sometimes a need for a means which can determine the position of an item with greater precision. U.S. patent application no. 20040203846 provides such a solution. One embodiment of this patent application includes a collection of wall-mounted antennas. The item's location is calculated by gathering the phase difference or other timing information of signal generated by the signal transmitting device on the entity. This location information is then given to end user applications.

Although this patent application provides a solution for accurately determining the position of an item in a given enclosed space, such as a room, it relies on positioning the signal gathering devices on three different walls in that room. This system lacks the flexibility and portability sometime needed. There is therefore a need for a means for calculating the precise location of an item without relying on previous information. In addition the means should have sufficient flexibility so it may provide these capabilities while being able to operate in different surroundings and environments.

SUMMARY

The present invention discloses a wireless communication system for performing measurements and positioning of objects in a given area. The system is comprised of at least one field beacon positioned at a target object, a central signal collector, made of at least three base beacons assembled in a polygon design of known dimensions, wherein each base beacon communicates with each of the field beacons, and an application software, wherein said software performs measurement calculations based on communication signal characteristics between the field beacons and the base beacons of the central collector. The system utilizes a measurements calculation method which is determined according to the geometrical shape of target objects. According to this measurement system the geometrical shape of a surface or of an opening is measured using at least three beacons.

The coordinates of the central signal collector may be determined on initialization using a GPS device, applying a field beacon to the three reference points with known coordinates, or in relation to at least three non-coplanar field beacons.

In order to perform measurements in a building, the field beacons can be positioned at different spaces within a building and the central signal collector is then moved sequentially from one space to another for each measurement session. An additional central signal collector may be used to increase measurement accuracy and for expanding the range of communication reception.

In one of the system's embodiments the field beacons can communicate with each other, enabling the creation of ad hoc signal collectors. This allows for improved measurements calculation accuracy and for expanding the range of communication. According to this embodiment at least three field beacons function as a relay station enabling communication between distanced beacons which are not in the communication range of the central collector. There are several communication methods which may be used to perform the communication and the measurements according to the present invention. The system field beacons and the base beacons may communicate using RF signals, in which case the distance measurements are based on RF signal properties. Communication may be performed using ultrasonic signals, wherein the distance measurements are based on the signals' time properties. Finally, the base beacons may communicate with the field beacons through laser signals, wherein the field beacons are bar-coded and the central signal device is a laser scanner.

The measurement calculations may be used for generating computerized drawings of a target structure. For example, the calculations may be used for surveying an existing structure for the purpose of creating as-built drawings, or, alternatively, measurement may be used for surveying surroundings before construction, wherein the field beacons are positioned at strategic locations, enabling the determination of the topographic relations between the beacons, or surveying surroundings under construction, wherein the field beacons are positioned at strategic locations, enabling the comparison between on-location positioning and construction designs.

The field beacons may be embedded into building for future maintenance or monitoring use. In this embodiment central collector's base beacons are set at permanent positions within a building, enabling the identification the exact position of objects' and of objects' movement within the building, provided that at least one field beacon is positioned on every identified object. The exact position or movement of the identified objects is incorporated within a three-dimensional visual model of the building. This embodiment may be used, for instance, to support a warehouse inventory management system, whereas the measured objects are inventory items.

The disclosed system may also include a three field beacon triangle structure which is connected to a pointing telescopic rod of a known length or to a laser-based distance measuring device enabling to measure any target point.

The disclosed invention also includes a wireless method for performing measurements and positioning of objects in a given area using at least one field beacon positioned at a target object and a central signal collector comprised of at least three base beacons assembled in a polygon design of known dimensions. This method is comprised of establishing communication between each of the base beacons and each of the field beacons, and performing measurement calculations based on communication signal characteristics between the field beacons and the base beacons of the central collector. According to this method the central signal collector is initialized by applying field beacons to three reference points with known coordinates. Alternatively, the central signal collector is initialized in relation to at least three non-coplanar field beacons, or using a GPS device.

As mentioned above, the method may also include the field beacons' ability to communicate with the other field beacons, enabling the creation of ad hoc signal collectors for improving measurements calculation accuracy and for expanding the range of communication reception. In this embodiment several beacons may perform as relay stations in order to enable communication between distanced beacons which are not in the communication range of the central collector.

Based on the measurement calculations, computerized drawings of a target structure may be generated. As-built drawings can be created when an existing structure is surveyed. Additionally, topographic relations of surroundings may be surveyed before construction. In this case the field beacons are positioned at strategic locations, enabling the determining of the position of each point in the given area. An additional use of the present invention allows for surveying surroundings which are under construction. The field beacons, which are positioned at strategic locations, enable performing comparisons between on-location positioning and construction designs.

BRIEF DESCRIPTION OF THE DRAWINGS

These and further features and advantages of the invention will become more clearly understood in the light of the ensuing description of a preferred embodiment thereof, given by way of example only, with reference to the accompanying drawings, wherein—

DESCRIPTION

The present invention is a new multifunctional low-cost solution for performing measurements and positioning in construction sites and automatically extracting a three-dimensional virtual model, plans, elevations and sections drawings based on these measurements. The preferred embodiment of the present invention consists of a field beacon or a set of field beacons, spread around the measured construction, communicating by omnidirectional signals with at least one central signal collector, which communicates with a computer. Dedicated computer software performs the spatial calculations and other applicable functions.

Figure 1:
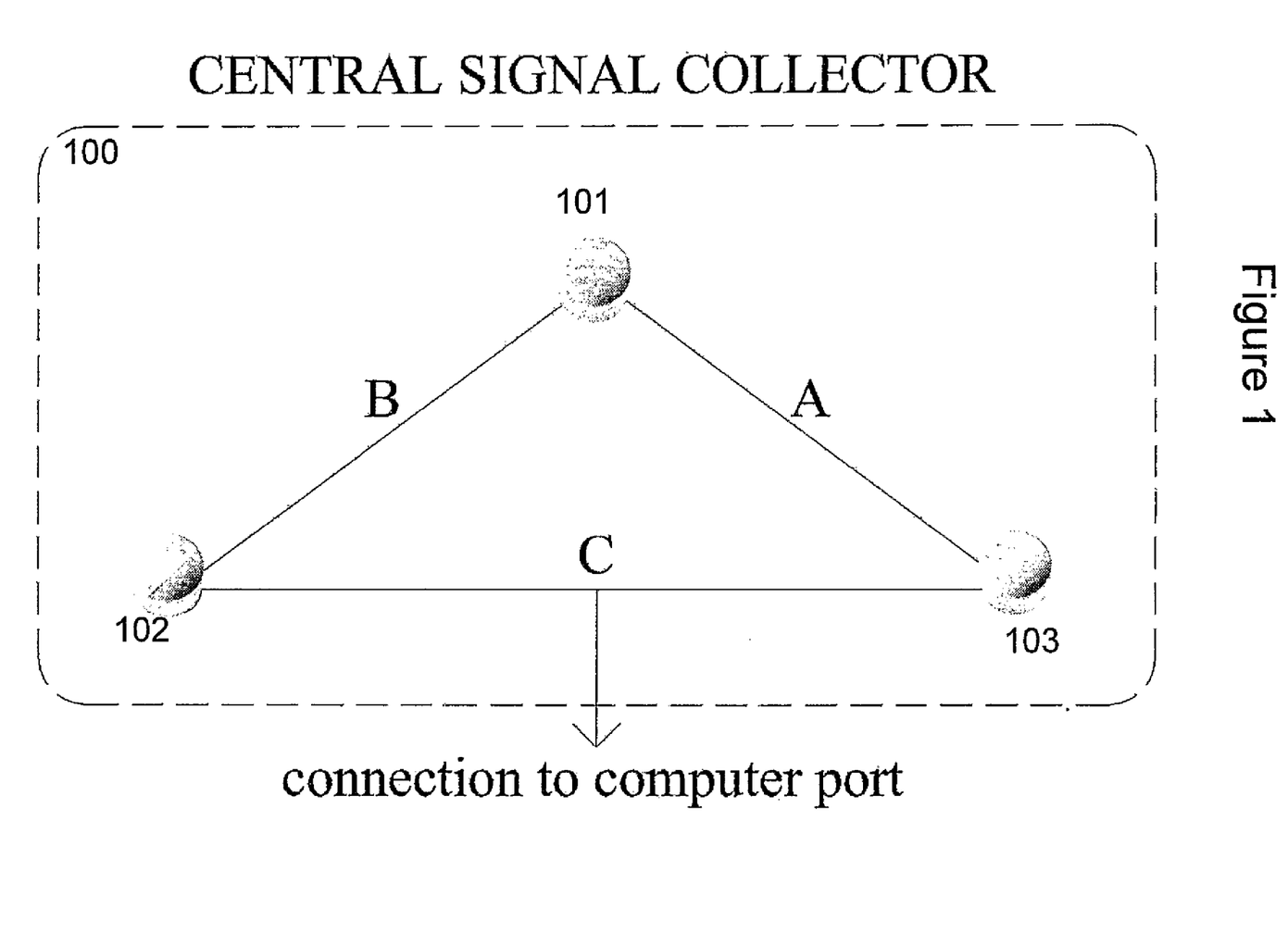
FIG. 1 is an illustration of the central collector in accordance with the present invention.

The structure of the central collector is illustrated in FIG. 1. It comprises three beacons 101, 102, 103, henceforth called base beacons, which are positioned at predetermined distances A, B, C apart from each other, forming a triangle. The central collector 100 is in turn connected to a computer. The central collector may include additional base beacons. Alternatively, two or more central collectors may be used to increase level of precision and flexibility.

Figure 2:
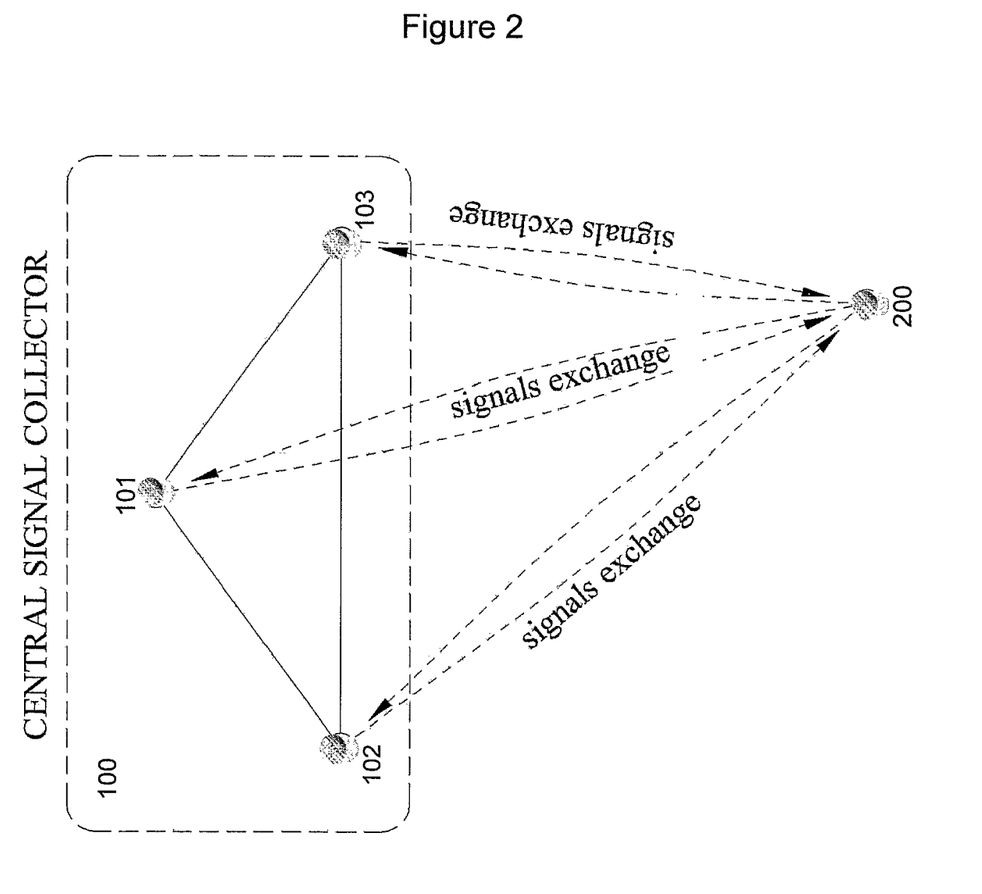
FIG. 2 is an illustration of the central collector's method of marker positioning in accordance with the present invention.

In order to perform a measurement, an additional beacon—a field beacon—is attached to the measured object and communicates with the central collector. As illustrated in FIG. 2 the field beacon 200 establishes a bidirectional signal exchange session with the three base beacons 101, 102, 103 of the central collector 100. The exact position of the field beacon 200 is determined using a simple geometric calculation: field beacon 200 is defined as the vertex of a triangle pyramid in which the three base beacons 101, 102, 103 of the central signal collector 100 are the pyramid's base. Each field beacon 200 placed on a target defines a single point.

In order to define various three-dimensional shapes, the field beacon has to be applied in several points. For each type of geometrically defined surface or shape a minimal number of measured points are needed. Alternatively, a number of field beacons may be used to perform this function. This manner of operation enables the system to efficiently perform measurements while not having to rely on existing drawings of the measured spaces, since knowing the type of measurement which is performed drastically reduces the amount of measurements needed, while at the same time the types of measurements are defined in general terms and do not rely on a priory data from the specific measured site. Knowing that the measured object is a flat surface, for instance, allows the system to settle for only three individual measurements on that surface. The system can then extrapolate the exact position of that surface in space reference to the central signal collector. Once an additional surface in the same space is measured the system automatically finds their intersecting line (unless, of course, they are parallel to each other). Measuring a third surface automatically defines its lines of intersection with the first two surfaces and the corner in which the three surfaces meet.

Field beacons may therefore be grouped in one of several group types: as surface defining beacons, as opening defining beacons and as distance defining beacons. For defining a surface beacons are grouped in groups of three (for defining a flat surface) or more (for defining a curved surface); for defining an opening beacons are grouped in groups of three (for triangular openings), four (for square openings) or more (for other shapes of openings); and pairs of beacons are used for measuring distances.

The field beacons may be grouped by software or hardware means. Grouping beacons by hardware means may be achieved by having sets of field beacons connected to each other for the purpose of executing a specific type of measurement, e.g. a triangle of three connected field beacons which are set in known distances may be used for measuring flat surfaces. The software grouping enables performing the measurements by a single field beacon.

Figure 3:
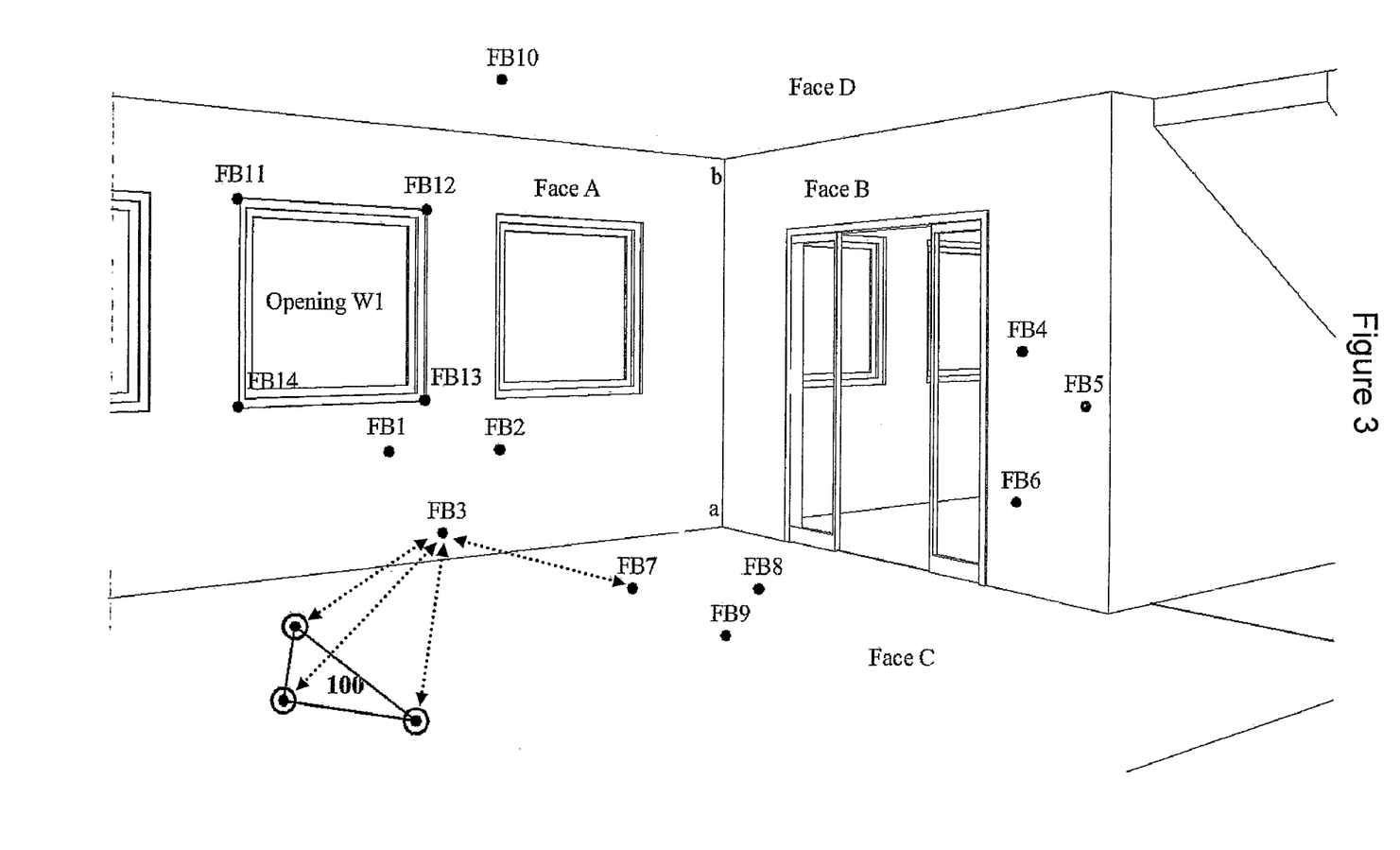
FIG. 3 is an illustration of the present invention method of operation in a construction site.

An example of the method of operation of the present invention is illustrated in FIG. 3. The field beacons FB1-FB14 are placed at different positions in the measured construction; the three types of field beacons are demonstrated. In order to define faces A, B, and C three groups of beacons containing three beacons each are defined: beacons FB1, FB2 and FB3 for defining face A; beacons FB4, FB5 and FB6 for defining face B; and beacons FB7, FB8 and FB9 for defining face C. A single beacon FB10 is sufficient for defining face D (ceiling surface) since it is parallel to the previously defined face C (floor surface). Beacons FB11, FB12, FB13 and FB14 are placed at the corners of window W1 and are defined as opening defining beacons.

Knowing the position and the group type of each field beacon allows the computer to accurately calculate the structure of the target construction. Knowing the position of faces A and B allows finding the line of intersection and the intersection of this line with the surface of the floor C. This would give the position of corner a. The same is then done with the surface of the ceiling in order to find corner b. The computer can then accurately build a three dimensional virtual models, plans, elevations and sections drawings of the measured construction.

Once the field beacons are installed on the target points and the target surfaces, the field beacons are initialized and start to communicate with the three base beacons of the central collector. Every field beacon communicates with each of the three base beacons. The signal transmission parameters information, the affiliation of the field beacon to a specific group, and the identification of every field beacon is coded and sent from each field beacon to the three base beacons.

For each field beacon the computer collects the distances measured between it and the three base beacons. The position of the central signal collector may be initialized according to the world coordinate system using a Global Positioning System (GPS) device, which may be integrated into the central collector. Its position may also be defined in relation to four non-coplanar field beacons and create a temporary coordinate system. Alternatively, its position may be defined in relation to the three field beacons applied to the reference points with known geodesic coordinates. Based on this coordinate system the computer can then determine the exact spatial position of each field beacon.

Figure 4:
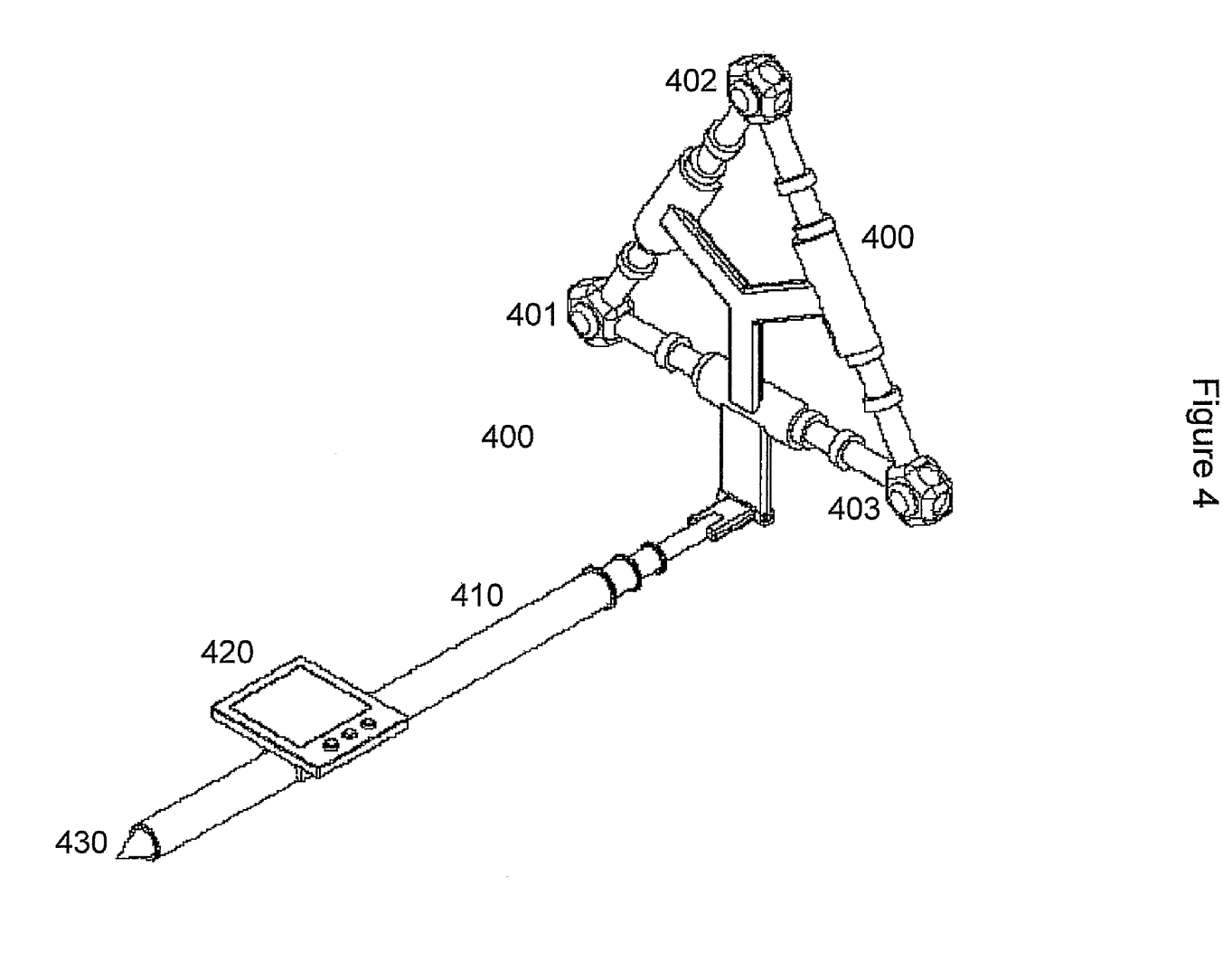
FIG. 4 is an illustration of a three beacons apparatus for performing sequential measurements.

Another method for performing the measurements in accordance with the present invention is by using an apparatus such as is illustrated in FIG. 4. The apparatus 400 is comprised of three field beacons 401, 402, 403 which are fixed at the vertexes of a triangle 400. Also attached to the triangle 400 is a rod 410 which may be fixed in length or telescopic. The pointed tip 430 of rod 410 allows performing highly exact measurements and overcoming measurements errors such as parallax: the sheer size of the beacon might impede it from providing highly exact measurements of certain locations such as corners. Since tip 430 is at a known distance from triangle 400, its position in space may be easily calculated based on data from beacons 401, 402 and 403. The triangle 400 may then be used to perform measurements of flat surfaces, and the tip 430 is used to perform measurements of the positions of points, such as the corners of an opening.

The apparatus 400 may also make use of a laser beam instead of rod 410. The apparatus 400 may then include a laser-based distance measuring device. The exact position of the target point is measured by marking it with the laser beam. The laser-based distance measuring device on apparatus 400 provides the exact distance between the apparatus and the target point and the three field beacons 401, 402 and 403 of the apparatus provide the necessary data to provide the target point's coordinates.

Provided that field beacons are set in place in every room on every surface and opening in a building, there are two main manners in which the mapping of the entire building may be performed. First, the central signal collector may be moved sequentially from one room to the next and collect the data from the field beacons. In this case whenever the central collector is moved, its new location needs to be initialized in relation to its previous location or in relation to the global positioning coordinates. Alternatively, as mentioned above, two central collectors may be used and communicate with each other to increase precision and expand the range of communication reception. In such cases one central collector may be moved and its new position is then determined with the aid of the second central collector.

An additional embodiment of the present invention may include field beacons which can communicate with each other and not just with the central collector. In this embodiment the three or more field beacons create an ad hoc signal collector in which the exact location of every field beacon is accurately measured. A single central collector may be used in this embodiment to collect the information not only from field beacons in its proximity which can communicate with it directly, but also with distant field beacons which are out of its reception range. In this case field beacons, which are positioned between the distant field beacons and the central collector, may perform as relay stations.

The communication means of the present invention include four embodiments. According to the first communication embodiment the beacon communicate via RF means. In this embodiment the distance measurement is performed using interpretation of the RF signal properties (frequency, phase, amplitude, etc.), the signal delay or a combination thereof. The RF field beacons may also be passive and only respond to enquiry pulses from the central collector. In the second embodiment of the communication means of the invention the communication between the beacons is performed by ultrasonic means. In this case all field beacons are active and distance and directional analysis rely on the signal's time properties. The third embodiment is based on a combination of the first two communication means. The fourth embodiment operates by means of laser scanners. In this case the field beacons are bar-coded and the central collector is a laser scanner. The field beacons in this instance are all passive and the central collector spots them by performing a minimal amount of scanning. In all four embodiments the time and direction analysis are performed in standard manners, which are known to people who are skilled in the art.

Although the above specified example focuses on performing measurements and generating computerized drawings of an existing structure, the disclosed invention may also be used for measurements and positioning in general. The system may be used, for instance, for surveying surroundings, which are not constructed. In such cases the field beacons are placed in strategic locations for the purpose of collecting data about their exact position and for determining the topographic relations between them. The invention may also be used during construction as a means for measuring distances, determining positions and for quality control of the construction. Since the system may have access to the drawing of the construction design, a real-time on-location position marking and distances comparison may be performed. The system may communicate with traditional survey instrument such as theodolites, total stations, etc. and automatically integrate their data or set their position. In addition, during the construction phase passive RF field beacons may be embedded into the walls for future use.

Once it is embedded into a building additional applications of the system may be implemented. The system may be used, for instance, for security needs. Since it can accurately determine the position of every element which holds one of its field beacons, and any change in the field beacons' position may be detected in real-time, the system can easily determine whenever a door or a window are opened, or when any other stationary items, such as chairs and tables, are moved. The system may also be used for detecting breaches in security, associated misplaced items. Field beacons may, for example, be discreetly attached to files containing sensitive information; any unauthorized dislocation of those files, can be discovered in real-time.

Other applications of the present invention include a locating system which may track and locate different items inside the building. An identification-coded field beacon can be attached to every object and person which needs to be traced in the facility. The tag can then constantly communicate with base beacons in its vicinity and its exact location can then be determined at every point in time. The system's user interface may pinpoint the tag on a three-dimensional virtual model of the facility. This application may be used for keeping track of inventory in warehouses, of equipment in hospitals, of workers and visitors on big facilities, etc.

While the above description contains much specificity, these should not be construed as limitations on the scope of the invention, but rather as exemplifications of the preferred embodiments. Those skilled in the art will envision other possible variations that are within its scope. Accordingly, the scope of the invention should be determined not by the embodiment illustrated, but by the appended claims and their legal equivalents.

What is claimed is:

1. A wireless communication system for performing measurements and positioning of objects in a given structure, the wireless communication system comprising:

at least one field beacon positioned at least one target point;

a central signal collector comprising at least three base beacons assembled in a polygon design of known dimensions, wherein each base beacon communicates with each of the at least one field beacon;

an application software arranged to perform calculations based on measurements of communication signal characteristics between the at least one field beacon and the base beacons of the central collector and further arranged to enable the identification of points' exact position within the given structure, wherein at least one field beacon is positioned on every identified point and the at least three base beacons are set at positions within the given structure; and a module that creates a three-dimensional visual model of the given structure based on the identification and calculations of points' exact position within the given structure.

2. The wireless communication system of claim 1, wherein the at least one target point defines a target object and the performed calculations are determined according to the geometrical shape of the target object.

3. The wireless communication system of claim 2, wherein the geometrical shape is a surface, including at least three field beacons or touched by one field beacon in at least three points.

4. The wireless communication system of claim 2, wherein the geometrical shape is an opening, including at least three field beacons or touched by one field beacon in at least three points.

5. The wireless communication system of claim 2, wherein the central collectors base beacons are set at permanent positions within the given structure, and wherein the target objects are inventory items and the performed calculations support warehouse inventory management.

6. The wireless communication system of claim 1, wherein the central signal collector's initial position is initialized by a GPS device.

7. The wireless communication system of claim 1, wherein the central signal collector's initial position is initialized by at least one field beacon applied to the three reference points with known coordinates.

8. The wireless communication system of claim 1, wherein the central signal collector position is initialized in relation to at least three non-aligned field beacons.

9. The wireless communication system of claim 1, further comprising an additional central signal collector for increasing measurement accuracy and for expanding the range of communication reception.

10. The wireless communication system of claim 1, wherein the field beacons communicate with each other, enabling the creation of ad hoc signal collectors for improving the accuracy of the performed calculations and for extending the range of communication reception.

11. The wireless communication system of claim 10, wherein at least three field beacons function as a relay station enabling communication between distanced beacons which are not in the communication range of the central collector.

12. The wireless communication system of claim 1, wherein the at least one field beacon and the base beacons communicate through RF signals, wherein the distance measurements are based on RF signal properties.

13. The wireless communication system of claim 1, wherein the at least one field beacon and the base beacons communicate through ultrasonic signals, wherein the distance measurements are based on the signals time properties.

14. The wireless communication system of claim 1, wherein the at least one field beacon and the base beacons communicate through laser signals, wherein the at least one field beacon are bar-coded and the central signal device is a laser scanner.

15. The wireless communication system of claim 1, wherein the performed calculations are used for surveying surroundings before construction, wherein the field beacons are positioned at strategic locations, enabling the determination of the topographic relations between the beacons.

16. The wireless communication system of claim 1, wherein the measurement calculations are used for surveying surroundings under construction, wherein the at least one field beacon are positioned at strategic locations, enabling the comparison between on-location positioning and construction designs.

17. The wireless communication system of claim 1, wherein the given structure is a building and wherein at least one of the field beacons is embedded into the building for future maintenance or monitoring use.

18. The wireless communication system of claim 1, wherein the central collectors base beacons are set at permanent positions within the given structure.

19. The wireless communication system of claim 1, wherein the movement of the identified objects is incorporated within the three-dimensional visual model of the building.

20. The wireless communication system of claim 1, further comprising a three field beacon triangle structure which is connected to a laser-based distance measuring device to measure any target point.

21. A wireless communication system for performing measurements and positioning of objects in a given structure, the wireless communication system comprising:

at least one field beacon positioned at a target object;

a central signal collector, comprising at least three base beacons assembled in a polygon design of known dimensions, wherein each base beacon communicates with each of the field beacons; and an application software arranged to perform calculations based on measurements of communication signal characteristics between the at least one field beacon and the base beacons of the central collector, wherein the field beacons are positioned at different spaces within the given structure;

and wherein the central signal collector is moved sequentially from one space to another for each measurement session.

22. A wireless communication system for performing measurements and positioning of objects in a given structure, the wireless communication system comprising:

at least one field beacon positioned at a target object;

a three field beacon triangle structure connected to a pointing telescopic rod of a known length;

a central signal collector, comprising at least three base beacons assembled in a polygon design of known dimensions, wherein each base beacon communicates with each of the field beacons; and     an application software arranged to perform calculations based on measurements of communication signal characteristics between the at least one field beacon and the base beacons of the central collector, wherein three field beacon triangle structure enables to measure any target point.

\* \* \* \* \*